UNITED STATES PATENT OFFICE.

ROBERT ABBOTT HADFIELD, OF WESTMINSTER, ENGLAND.

MELTING OF IRON AND STEEL TURNINGS, SCRAP, AND THE LIKE.

1,326,861.     Specification of Letters Patent.     Patented Dec. 30, 1919.

No Drawing.     Application filed September 16, 1918. Serial No. 254,352.

*To all whom it may concern:*

Be it known that I, Sir ROBERT ABBOTT HADFIELD, Bart., F. R. S., a subject of the King of Great Britain and Ireland, residing at city of Westminster, England, have invented Improvements in or Relating to the Melting of Iron and Steel Turnings, Scrap, and the like, of which the following is a specification.

Iron and steel turnings, scrap and the like are commonly remelted in an acid lined open hearth melting furnace by including them in furnace charges containing a large percentage of pig or cast iron, the latter serving to prevent the oxid of iron or rust, with which the turnings, scrap and the like are usually coated, acting injuriously to any great extent upon the acid lining of the furnace.

Now the present invention has for its object to enable iron and steel turnings, scrap and like material, to be remelted in acid lined open hearth furnaces, without using pig or cast iron, and thus to enable the large quantities of such material now being produced in munition works to be at once remelted in existing open hearth furnaces and utilized in the production of munitions, so as in this way to effect considerable economy in time, labor and capital expenditure, and without the charge acting injuriously to any great extent upon the lining.

To enable the object of this invention to be attained the bottom and banks of the open hearth furnace are first covered with a layer of a mixture of crushed ferro-silicon and carbonaceous material of good quality, for instance anthracite broken up small, after which the charge of iron or steel turnings or scrap, or of turnings and scrap, is placed in the furnace upon the said layer of mixture and melting of the charge effected in the usual manner. The mixture of ferro-silicon and anthracite serves to prevent or minimize chemical action taking place between the acid lining of the furnace and the coating of iron oxid on the metal charge and thus prevents or reduces cutting of or destructive action on the said lining, without the use of pig iron. A small quantity of pig iron may however be used, if desired, but such use is not necessary for insuring the successful carrying out of the remelting operation of the turnings, scrap and the like. Also, iron ore may be added to the charge if or where necessary or desired.

The mixture for covering and protecting the furnace bottom and banks may advantageously consist of equal quantities by weight of 50% ferro-silicon and anthracite crushed to pass through a ¾ inch riddle. The quantity of mixture used is adjusted to add sufficient silicon to prevent premature boil and sufficient carbon to prolong the boil while a finishing slag is being formed.

It has been found by experiment that the average time for remelting a charge of turnings or scrap, or turnings and scrap, that is to say, the time of working a heat, is usually shorter than that of working the ordinary heats of open hearth furnaces, so that there will be an increased output from the furnace when using the same to carry out the present invention.

By using scrap with the turnings, the percentage of sulfur, derived from the anthracite, in the resulting metal will be smaller than when turnings alone are used. In the latter case, or in any case where the percentage of sulfur in the remelted metal is higher than is desirable, ferro-manganese may be added to the molten metal to reduce the percentage of sulfur therein. Or the remelted metal may be subjected to a refining process in a separate furnace to reduce the percentage of sulfur. Or ferro-manganese may be added to the molten metal and the molten metal afterward subjected to a refining process. The subsequent refining process can advantageously be effected by transferring the remelted metal to an electric furnace and subjecting it to the ordinary refining treatment therein until the percentage of sulfur is reduced to the desired extent.

According to one example, in which about 27 tons of ordinary carbon steel turnings alone were melted, the bottom of the open hearth furnace was first covered with a layer of crushed slag from a previous melting operation and then with a layer of the mixture of crushed ferro-silicon and anthracite. The charge of turnings was divided into three batches. The first batch was charged as quickly as possible so as to cover the mixture and prevent undue oxidation thereof and melted, the remaining batches being introduced at intervals, the whole of the turnings being introduced over a period of about four hours. Immediately before charging each batch of turnings, a layer of the mixture was spread on the banks of the furnace. When the charging operation was completed a layer of small anthracite was thrown around the edges of the metal bath to prevent any possible cutting action which might otherwise take place during the melting. The charge was completely melted in about seven and a half hours after the commencement of charging. About five hundredweight of iron ore (Cumberland iron ore) was introduced just before the charge came on boil and the boil was maintained until the carbon content had fallen to the required point and then stopped with the usual addition of ferro-silicon. Ferro-manganese was added to the bath of molten metal to reduce the percentage of sulfur therein.

In this example the whole charge amounted to 28 tons 4 cwts. consisting of 27 tons 3 cwts. of turnings; 10 cwts. of ferro-silicon in the mixture and 3 cwts. of ferro-silicon and 8 cwts. of 80% ferro-manganese added as physic to the charge during the heat as described. The heat lasted about ten and a half hours and the resulting metal, when cast, gave the following analysis, namely, C 0.40, Si 0.15, S 0.080, P 0.042, Mn 0.92. In this example about 5 cwts. of anthracite nuts were added as described to the furnace during the heat for the purpose hereinbefore mentioned.

In another example, carried out in the same way and where the whole charge was about the same as before but consisted of about 19 tons 7 cwts. of carbon steel turnings, 7 tons 16 cwts. of scrap, 10 cwt. of ferro-silicon in the mixture and about 3 cwts. of ferro-silicon and 8 cwt. of 80% ferro-manganese added as physic, the scrap being added last on top of the turnings, the charge was melted in about 6½ hours, the heat lasted about 9 hours and the resulting steel, when cast, gave the following analysis, namely C 0.39, Si 0.21, S 0.063, P 0.040, Mn 0.94. In this example about 2 cwts. of anthracite nuts were added to the furnace during the heat.

In a further example, carried out in the same way but where the total charge amounted to about 28 tons 14 cwt. consisting of about 17 tons 15 cwts. of carbon steel turnings, 10 tons 1 cwt. of scrap, 7½ cwts. of ferro-silicon in mixture and about 2 cwts. 3½ qrs. of ferro-silicon and 7 cwts. 2½ qrs. of 80% ferro-manganese as physic, the charge was melted in about 6 hours 40 minutes, the heat lasted about 8 hours and the resulting steel, when cast, gave the following analysis namely C 0.38, Si 0.27, S 0.062, P 0.040, Mn 0.85. In this example about 5 cwts. of anthracite nuts were added to the furnace during the heat.

In each case the bottom and banks of the furnace at the end of the heat were in very good condition, showing no indication of abnormal wear.

What I claim is:—

1. The herein described method of remelting iron or steel turnings, scrap or like material, of a mixture thereof, in an acid lined open hearth furnace without the need of using pig or cast iron, which consists in covering the bottom and sides of the furnace with a mixture of crushed ferro-silicon and carbonaceous material of good quality, placing the charge of iron or steel turnings or scrap, or a mixture thereof, upon the mixture of ferro-silicon and carbonaceous material and melting the charge.

2. In the remelting of iron or steel turnings, scrap or the like according to the preceding claim, adding the charge of turnings, scrap or the like in batches, the first batch being charged as quickly as possible upon the layer of mixture of ferro-silicon and carbonaceous material so as to cover the same and melted and adding the remaining batches at intervals, a layer of mixture of ferro-silicon and carbonaceous material being spread on the banks of the furnace before each batch is added.

3. In the remelting of iron or steel turnings, scrap or the like according to the preceding claims, adding the charge of turnings, scrap or the like in batches, the first batch being charged as quickly as possible upon the layer of mixture of ferro-silicon and carbonaceous material so as to cover the same and melted and adding the remaining batches at intervals, a layer of mixture of ferro-silicon and carbonaceous material being spread on the banks of the furnace before each batch is added, completely melting the charge, adding iron ore to the charge just before it comes on boil, and maintaining the boil until the carbon content has fallen to the required point and stopping the boil by addition of ferro-silicon.

4. The method of remelting iron and steel turnings scrap or like material in an acid lined open hearth furnace, which consists in covering the bottom and sides of the furnace with a mixture of crushed ferro-silicon and carbonaceous material, placing the charge of turnings or the like on the layer of mixture, melting the charge and subjecting the melted charge to a refining treatment to reduce the amount of carbon and sulfur therein.

5. The method of remelting iron and steel turnings, scrap or like material in an acid lined open hearth furnace, which consists in covering the bottom and sides of the furnace with a mixture of crushed ferro-silicon and carbonaceous material, placing the charge of turnings, scrap or the like over the layer of mixture, placing a layer of broken anthracite around the edges of the charge, melting the charge and subjecting it to a refining treatment to reduce the carbon content therein to the required point.

6. The method of remelting iron and steel turnings, scrap or like material in an acid lined open hearth furnace, which consists in covering the bottom and sides of the furnace with a mixture of crushed ferro-silicon and carbonaceous material, placing the charge of turnings or the like on the layer of mixture, melting the charge and subjecting the melted charge to the action of ferro-manganese for the purpose set forth.

7. The method of remelting iron and steel turnings, scrap or like material in an acid lined open hearth furnace, which consists in covering the bottom and sides of the furnace with a mixture of crushed ferro-silicon and carbonaceous material, placing the charge of turnings or the like on the layer of mixture, melting the charge and bringing it to the boil, adding ferro-manganese to the melted metal, maintaining the boil until the carbon content has fallen to the required point and then stopping the boil by addition of ferro-silicon.

8. The method of remelting iron and steel turnings, scrap or like material in an acid lined open hearth furnace, which consists in covering the bottom and sides of the furnace with a mixture of crushed ferro-silicon and carbonaceous material, the quantity of mixture used being adjusted to add sufficient silicon to prevent premature boil and sufficient carbon to prolong the boil while a finishing slag is being formed, placing the charge of turning or the like over the layer of said mixture, melting the charge, adding iron ore to the melted charge and bringing the charge to the boil, adding ferro-manganese to the melted charge, maintaining the boil until the carbon is reduced to the required point and finally adding ferro-silicon to the refined charge.

9. The method of remelting iron and steel turnings, scrap and the like in an acid lined open hearth furnace, which consists in covering the bottom and sides of the furnace with a mixture of crushed ferro-silicon and carbonaceous material, placing a charge of iron or steel turnings thereon, and adding a charge of iron or steel scrap on the top of the charge of turnings, melting the charge and bringing it to the boil, adding ferro-manganese to the melted charge, maintaining the boil until the carbon contents have been reduced to the required points and stopping the boil by addition of ferro-silicon.

10. The herein described method of remelting iron and steel turnings, scrap and the like in an acid lined open hearth furnace, which consists in covering the bottom and sides of the furnace with a crushed mixture of ferro-silicon and carbonaceous material, the quantity of mixture used being adjusted to add sufficient silicon to prevent premature boil and sufficient carbon to prolong the boil while a finishing slag is being formed, placing the charge of iron and steel turnings, scrap and the like over the layer of mixture, placing a layer of broken anthracite around the edges of the charge, melting the charge and bringing it to the boil, adding ferro-manganese to the molten metal, maintaining the boil until the carbon content is reduced to the required point and stopping the boil by addition of ferro-silicon.

Signed at London, England, this nineteenth day of August, 1918.

ROBERT ABBOTT HADFIELD.